(12) United States Patent
Bajpai et al.

(10) Patent No.: US 8,750,112 B2
(45) Date of Patent: Jun. 10, 2014

(54) METHOD AND NODE FOR EMPLOYING NETWORK CONNECTIONS OVER A CONNECTIONLESS TRANSPORT LAYER PROTOCOL

(75) Inventors: Parimal Bajpai, Bangalore (IN); Vikal Kumar Jain, Bangalore (IN); Aparna Sarma Akella, Bangalore (IN)

(73) Assignee: EchoStar Technologies L.L.C., Englewood, CO (US)

( * ) Notice: Subject to any disclaimer, the term of this patent is extended or adjusted under 35 U.S.C. 154(b) by 283 days.

(21) Appl. No.: 12/405,062

(22) Filed: Mar. 16, 2009

(65) Prior Publication Data

US 2010/0232438 A1 Sep. 16, 2010

(51) Int. Cl.
*H04L 12/26* (2006.01)

(52) U.S. Cl.
USPC .......................................... 370/231

(58) Field of Classification Search
USPC .......................................... 370/231
See application file for complete search history.

(56) References Cited

U.S. PATENT DOCUMENTS

| | | | |
|---|---|---|---|
| 6,273,622 B1 * | 8/2001 | Ben-David .................... | 709/230 |
| 7,353,380 B2 * | 4/2008 | VanHeyningen ............. | 713/150 |
| 7,650,416 B2 * | 1/2010 | Wu et al. ....................... | 709/228 |
| 7,773,550 B2 * | 8/2010 | Lin ................................ | 370/313 |
| 7,957,406 B2 * | 6/2011 | Standridge et al. .......... | 370/401 |
| 8,493,931 B1 * | 7/2013 | Nix ............................... | 370/331 |
| 2003/0115357 A1 | 6/2003 | Chu et al. | |
| 2003/0229779 A1 * | 12/2003 | Morais et al. ................ | 713/153 |
| 2005/0021830 A1 * | 1/2005 | Urzaiz et al. ................. | 709/234 |
| 2005/0265252 A1 * | 12/2005 | Banerjee et al. ............. | 370/252 |
| 2006/0215652 A1 * | 9/2006 | Strandridge et al. ......... | 370/389 |
| 2006/0230163 A1 * | 10/2006 | Fish, III ........................ | 709/229 |
| 2007/0070996 A1 * | 3/2007 | Oran ............................ | 370/389 |
| 2007/0165865 A1 * | 7/2007 | Talvitie ........................ | 380/286 |
| 2007/0192865 A1 * | 8/2007 | Mackin ........................ | 726/24 |
| 2007/0208774 A1 * | 9/2007 | Paila et al. ................... | 707/103 R |
| 2008/0049619 A1 * | 2/2008 | Twiss ........................... | 370/236 |
| 2008/0075048 A1 | 3/2008 | Suszko | |

(Continued)

OTHER PUBLICATIONS

"Transmission Control Protocol", retrieved from internet site: http://en.wikipedia.org/w/index.php?title=Transmission_Control_Protocol&printable=yes on Jun. 15, 2009, 17 pages.

(Continued)

*Primary Examiner* — Jay P Patel

(74) *Attorney, Agent, or Firm* — Ingrassia Fisher & Lorenz, P.C.

(57) ABSTRACT

A method of establishing a network connection between two nodes of a communication network via a connectionless transport layer communication protocol is presented. In the method, a plurality of data packets is exchanged between a first node and a second node. Each of the data packets comprises a header and a payload formatted according to the connectionless protocol. The connectionless protocol payload of each of the data packets includes a separate header comprising a first port indicator for the first node and a second port indicator for the second node. The separate header of at least one of the data packets also includes an indication to establish a connection between the first node and the second node. In response to the exchange of data packets, the first and second nodes establish the connection, wherein the first port indicator and the second port indicator are associated with the established connection between the nodes.

22 Claims, 8 Drawing Sheets

(56) References Cited

U.S. PATENT DOCUMENTS

| | | | |
|---|---|---|---|
| 2008/0141020 A1* | 6/2008 | VanHeyningen | 713/150 |
| 2008/0177997 A1* | 7/2008 | Morais et al. | 713/153 |
| 2008/0281976 A1 | 11/2008 | Kemp | |
| 2008/0285565 A1* | 11/2008 | Gunther | 370/394 |
| 2009/0049178 A1* | 2/2009 | Dierks et al. | 709/227 |
| 2009/0168799 A1* | 7/2009 | Crowley et al. | 370/463 |
| 2010/0005180 A1* | 1/2010 | Tyukasz et al. | 709/228 |
| 2010/0220721 A1* | 9/2010 | Standridge et al. | 370/389 |
| 2011/0246489 A1* | 10/2011 | Pope et al. | 707/754 |
| 2011/0320623 A1* | 12/2011 | Kivinen et al. | 709/230 |
| 2013/0305036 A1* | 11/2013 | Vos | 713/151 |

OTHER PUBLICATIONS

"Reliable User Datagram Protocol", retrieved from internet site: http://en.wikipedia.org/w/index.php?title=Reliable_User_Datagram_Protocol&printable=yes on Jun. 15, 2009, 1 page.

"Real-time transport Protocol", retrieved from internet site: http://en.wikipedia.org/w/index.php?title=Real-time_Transport_Protocol&printable=yes on Jun. 15, 2009, 6 pages.

"RTP Control Protocol", retrieved from internet site: http://en.wikipedia.org/w/index.php?title=RTP_Control_Protocol&printable=yes on Jun. 15, 2009, 3 pages.

Extended European Search Report issued by the European Patent Office, dated Aug. 19, 2010.

* cited by examiner

EXAMPLE SOCKETS API FUNCTION CALLS

| Function Name | Purpose |
|---|---|
| sInit() | Creates socket layer structures. |
| sClose() | Frees socket layer structures. |
| sCreateSocket() | Creates a socket structure. |
| sCloseSocket() | Frees a socket structure. |
| sBind() | Binds an IP address (or logical ID) and port indicator to a socket structure. |
| sListen() | (Server) Creates a socket structure and awaits incoming connection request via connectivity module. |
| sConnect() | (Client) Initiates handshake to request a connection with another node through a given socket via the connectivity module. |
| sAccept() | (Server) Engage in handshake to accept request for connection from another node through a given socket via the connectivity module. |
| sSetSockOpt() | Provides write access to reliability module session parameters. |
| sGetSockOpt() | Provides read access to reliability module session parameters. |
| sSelect() | Facilitates checking of socket for read, write, or error status. |
| sSend() | Facilitates writing of user data to be stored in reliability module buffer for transmission across network. |
| sRecv() | Facilitates reading of user data that was received over network from reliability module. |

FIG. 4

METHOD AND NODE FOR EMPLOYING NETWORK CONNECTIONS OVER A CONNECTIONLESS TRANSPORT LAYER PROTOCOL

BACKGROUND

The Internet has become an important, and often critical, communication network for transporting data of many kinds, including textual, audio, and visual data, between distinct nodes of the network. The transfer of this data within the Internet is facilitated by a "stack" of architectural "layers", with each layer providing a corresponding type of functionality required of the network to transport the data. Each of these layers at least roughly corresponds to one or more of the seven layers of the Open Systems Interconnection (OSI) Reference Model, which identifies seven different layers (i.e., the physical layer, the data link layer, the network layer, the transport layer, the session layer, the presentation layer, and the application layer, in ascending order), only one of which represents the actual physical network connection. The remaining layers describe the various types of data and associated control information being generated and transferred within the network.

While different portions of the Internet often utilize diverse physical and data link layers, much of the Internet employs some version of the Internet Protocol (IP) for the network layer. Above the IP layer, however, several different options exist for the transport layer. Two of the more popular options are the Transmission Control Protocol (TCP) and the User Datagram Protocol (UDP). Generally, TCP provides for logical connections to be established between two end nodes of the network for subsequent data transfer therebetween. Also, TCP provides a data packet acknowledgement, timeout, and retransmission mechanism, as well as a packet sequencing facility, to protect against data loss. Conversely, UDP does not provide an acknowledgement, timeout, or retransmission mechanism, does not explicitly facilitate data packet sequencing, and does not establish a logical connection between two communicating network nodes. Accordingly, due to its lower overhead, UDP is often utilized in situations in which data loss is less important than any additional delay that may be incurred by using TCP for data packet transmission. Oppositely, TCP is typically employed in scenarios in which data reliability and integrity are important considerations.

Many network-connected computer systems provide a software "sockets" application programming interface (API) to allow software applications executing on the system to employ UDP, TCP, and other types of transport layers to communicate with other nodes on the network. One such API is the Berkeley Software Distribution (BSD) Sockets API, which provides a number of functions that may be called by applications to create and terminate connections over a network with another node, exchange data over such connections, and perform related activities using TCP, UDP, or another transport layer implementation.

While the use of TCP, UDP, the BSD sockets API, and other typical implementations of the various architectural layers of the Internet is widely accepted, use of these standard communication tools by two communication network nodes may not adequately address some specific data characteristics, network environments, and other concerns.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 4 is a listing of example functions forming a sockets application programming interface as shown in FIG. 3 according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
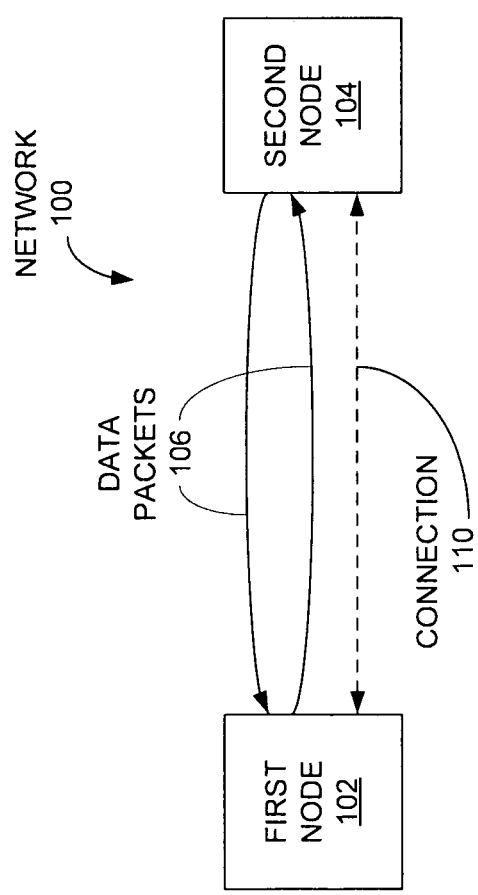
FIG. 1 is a simplified block diagram of two nodes of a communication network according to an embodiment of the invention.

FIG. 1 is a simplified block diagram of a communication network 100 in which a first node 102 and a second node 104 may establish a logical connection 110 therebetween for the transfer of data. Such a connection 110 is a logical association of the two nodes 102, 104 with each other for the purpose of transmitting and receiving data therebetween. In some embodiments, the connection 110 may facilitate error correction and other worthwhile mechanisms for the data being transferred. The network 100 may be any communication network over which digital data may be carried or transferred, including a local area network (LAN), or a wide area network (WAN), such as the Internet. While FIG. 2 implies a direct coupling between the nodes 102, 104, other communication devices, such as routers, switches, firewalls, and the like, may be employed to communicatively couple the nodes 102, 104 together in various arrangements. Further, the digital data being transmitted and received may include video data, audio data, textual data, numeric data, or any other form of digital data.

Figure 2:
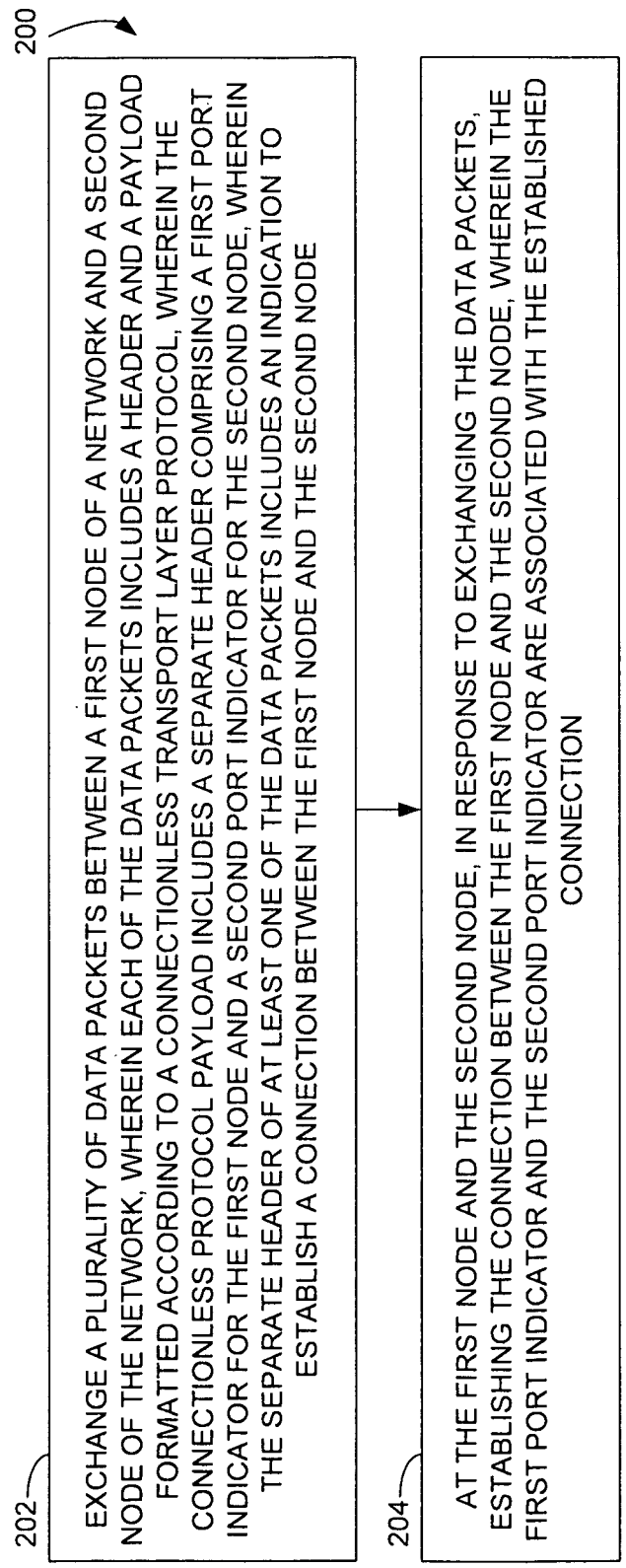
FIG. 2 is a flow diagram of a method according to an embodiment of the invention for establishing a connection between the nodes of FIG. 1 via a connectionless transport layer communication protocol.

FIG. 2 provides a flow diagram of a method 200 according to an embodiment of the invention for establishing a connection 110 between the first node 102 and the second node 104 via a connectionless transport layer communication protocol. Essentially, a connectionless transport layer communication protocol facilitates a basic mechanism for the transmission of "datagrams" without explicitly establishing a connection between the source and destination nodes involved beforehand. As a result, protection mechanisms, such as retransmission, error correction, sequencing of datagrams, and the like, are not implemented in a connectionless protocol in order to reduce overhead and increase data throughput. As discussed above, one example of a connectionless transport layer protocol is the User Datagram Protocol (UDP), which is commonly implemented in addition to the Transmission Control Protocol (TCP) atop the Internet Protocol (IP) network layer in a standard TCP/IP stack.

In the method 200, a plurality of data packets 106 are exchanged between the first node 102 and the second node 104 of the network 100 (operation 202). As suggested in FIG. 1, the data packets 106 transmitted from the first node 102 to the second node 104 may be transmitted over a different path through the network 100 than those packets 106 traveling in the opposing direction. Each of the data packets 106 includes a header and a payload formatted according to a connectionless transport layer communication protocol. Generally, a data packet header is control and/or status information related to the payload residing in the data packet, and is currently positioned at the end of the data packet 106, although other locations within the data packet are possible. Further, the connectionless protocol payload includes a separate header including a first port indicator for the first node 102 and a second port indicator for the second node 104. In one embodiment, a port number may be any indicator or value designating a logical input or pathway of a node identified with a particular set of communications. Also, the separate header of at least one of the data packets includes an indication to establish a connection 110 between the first node 102 and the second node 104.

In response to the exchange of the data packets 106, the first node 102 and the second node 104 establish the connection 110 between the first node 102 and the second node 104, wherein the first port indicator and the second port indicator are associated with the established connection 110 (operation 204). In another embodiment, a computer-readable storage medium may have encoded thereon instructions for a processor or other control circuitry to direct a device to implement the method 200.

Use of the method 200 may thus allow the nodes 102, 104 to establish a connection therebetween by way of a standard connectionless protocol, such as UDP, thereby circumventing a standard connection protocol, such as TCP, while still employing the network layer IP standard logic commonly provided in many communication devices. Accordingly, a communication protocol layer developed for a particular communication environment, such as the streaming of video data packets across the network 100, may be employed in lieu of the TCP protocol by employing the connectionless UDP protocol and underlying network layers as a data transmission mechanism. Further, the new transport layer may address communication situations associated with the nature of the data being transferred, the type of communication links being employed, and other characteristics that are not handled efficiently by a more standardized transport layer connection protocol.

Figure 3:
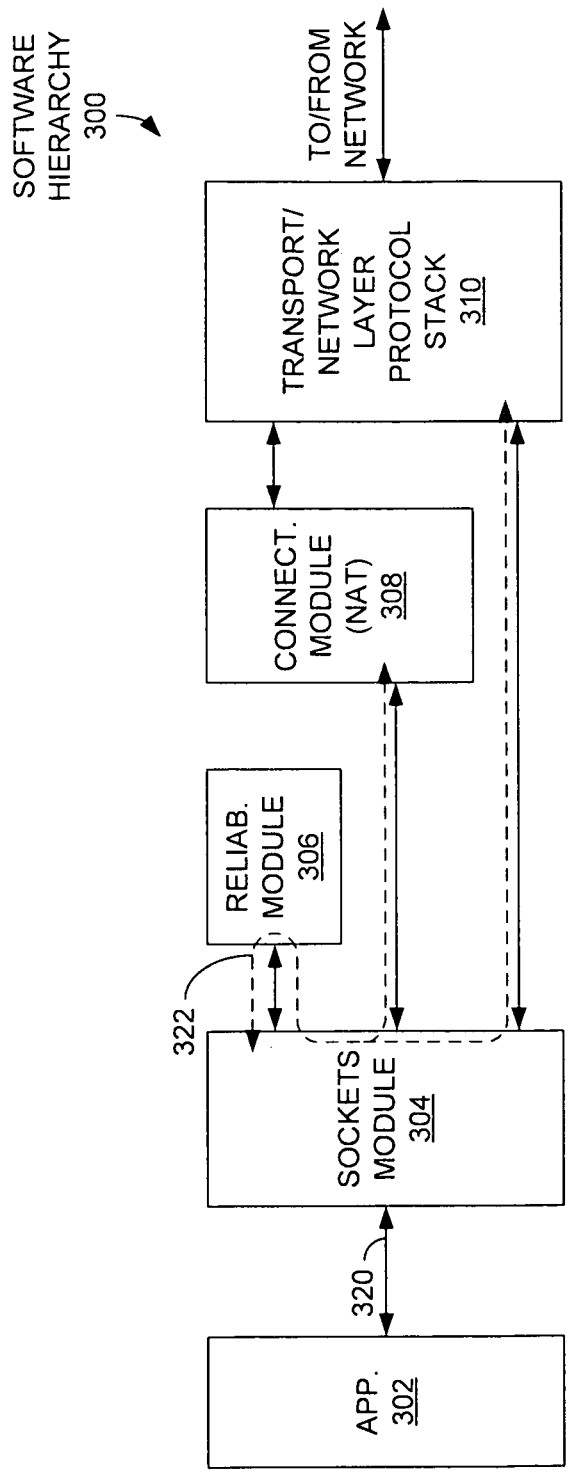
FIG. 3 is a block diagram of a communication software module hierarchy for a network node according to an embodiment of the invention for engaging in communications over a connection by way of a connectionless transport layer communication protocol.

FIG. 3 is a block diagram of a particular communication software module hierarchy 300 that may be implemented within a network node. The hierarchy 300, when implemented within each of two network nodes, facilitates the establishment of a connection between the nodes over a connectionless transport layer communication protocol. While the following discussion focuses on the specific hierarchy 300 of FIG. 3 as a software platform by which the connection may be established, other software architectural configurations may be employed to similar effect in other implementations.

The software hierarchy 300 includes an application 302, a "sockets" module 304, a reliability module 306, a connectivity module 308, and a transport/network layer protocol stack 310, such as a TCP/IP stack, including support for a connectionless transport layer protocol, such as UDP. The application 302 may be any application-level software requiring access to a communication network. In one specific implementation, the application 302 may be an audio/video stream source and/or display application, thus necessitating access to the communication network for the transmission and/or reception of audio/video data. For example, an audio/video destination, such as a computer system, a personal digital assistant (PDA), or a mobile communication device, may attempt to establish a communication connection with a video source node, such as a Slingbox by Sling Media, Inc., coupled to a satellite or cable set-top box, so that the destination node may stream video from the set-top box via the source node over the network. In this case, the source node may be viewed as a server node, while the destination node may be regarded as a client node, with both the server node and the client node each separately implementing the software hierarchy 300 of FIG. 3.

The sockets module 304 provides an application programming interface (API) through which the application 302 of the client or server device may access the network, including the establishment of connections and transfer of data over such connections. Such an interface is often facilitated by way of a set of function calls provided by the sockets module 304, such as those shown in FIG. 4, and explained in greater detail below. Generally, a "socket" is an endpoint of a communication path through the network defined by a node address (such as an IP address) and a port number. The sockets module 304 allows the application 302 to create one or more such sockets, request a connection to another node using the socket, transmit and/or receive data via the socket, free the socket, and other applicable tasks. Accordingly, the sockets module 304 implements many of the operations discussed in greater detail below concerning establishment and termination of one or more connections by way of a packet-based handshaking protocol using a connectionless transport layer protocol, retransmission of lost handshaking packets, and other functionality.

The sockets module 304 accesses the reliability module 306 to facilitate various protection mechanisms for the user data being transferred over an established connection between network nodes. In one implementation, such mechanisms may include, but are not limited to, sequencing of the user data packets to facilitate their proper ordering at the receiving node, acknowledgment (or non-acknowledgment) and retransmission of lost user data packets, and other functionality not provided by a connectionless transport layer protocol, such as UDP. Further, the reliability module 306 may implement such protections as a replacement for the standard TCP layer. For example, an example of such a reliability module 306 may be as described in U.S. patent application Ser. No. 12/404,920, entitled "Method and Node for Transmitting Data over a Communication Network Using Negative Acknowledgment", filed Mar. 16, 2009, which is hereby incorporated herein by reference in its entirety.

As shown in FIG. 3, the sockets module 304 may further interface with a connection module 308, which may facilitate the creation of "tunnels" or other mechanisms for maintaining a viable communication path between two network nodes.

The sockets module 304 also communicates with the standardized transport/network protocol stack 310, such as a TCP/IP stack which incorporates a connectionless transport layer protocol, such as UDP. In the embodiments discussed herein, the sockets module 304 employs the UDP portion of the TCP/IP stack, thus circumventing TCP while implementing the connection handshake mechanism described below. Also, sequencing and retransmission capabilities supplied by the reliability module 306 may also be implemented in lieu of the corresponding functionality normally provided in TCP. Thus, the functionality provided by the sockets module 304, the reliability module 306, and the connectivity module 308 may be tailored to address various aspects of specific communication environments more efficiently than that provided by TCP.

As shown in FIG. 3, the application 302 communicates with the sockets module 304 by way of function calls 320 without having to engage in the specific details of the other modules 306, 308, 310 provided in the software hierarchy 300. In turn, the sockets module 304 handles the required communications with the other modules 306, 308, 310, primarily in response to the function calls 320. In one implementation, a general control path 322 between the sockets module 304 and the reliability module 306, as well as between the sockets module 304 and each of the connectivity module 308 and the protocol stack 310, allows the sockets module 304 to control each resulting protocol layer involving in network communications with another node.

FIG. 4 provides a listing of possible function calls 320 presented to the application 302, some of which are briefly described below. For example, sInit( ) and sClose( ) allocate and release, respectively, the various structures and overall context for the sockets used for network communications. The functions sCreateSocket( ) and sCloseSocket( ) facilitate the creation and deletion of a specific socket employed in a communication connection. A created socket may then be bound to a particular IP address and port by way of the sBind( ) function. Creation of a connection using an existing socket is accomplished by way of one or more of the sListen( ), sConnent( ), and sAccept( ) functions, based on whether the application 302 is acting as a client (and, thus, is initiating a connection) or a server (which receives and acknowledges such an initiation). Once a connection is established, data may be sent to and received from another node by way of the reliability module 306 via the sSend( ) and sRecv( ) functions, which allow the application to read from and write to data buffers supplied by the reliability module 306. Other functions may provide access to control and status data, as well as other aspects, of the sockets module 304.

In one implementation, the sockets module 304 may handle a number of asynchronous events, such as those initiated by communication activity of another node on the network. For example, the sockets module 304 may respond to attempts by the other node to establish a new connection, terminate an existing connection, or to transmit data to the node employing the sockets module 304. Such events may be serviced by way of interrupt control, polling, or other asynchronous event-handling means.

Figure 5:
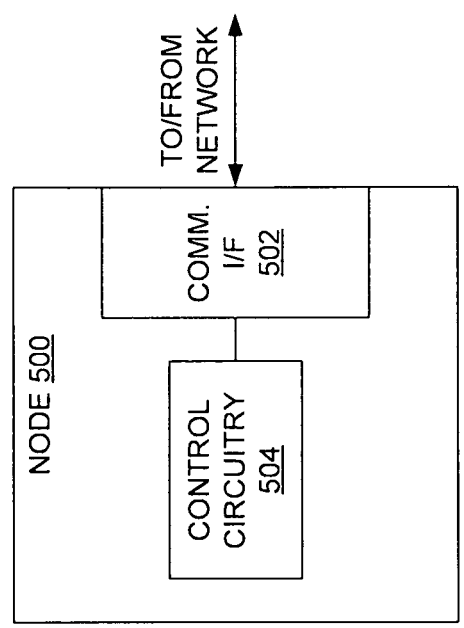
FIG. 5 is a simplified block diagram of a network node configured to establish a connection with another node according to an embodiment of the invention.

FIG. 5 provides a simplified block diagram of a node 500 of a communication network according to one embodiment of the invention. The node 500 includes a communication interface 502 and control circuitry 504. The communication interface 502 is configured to transmit and receive data packets with another node of the network. In one example, the communication interface 502 is an interface configured to communicate over an IP interface implemented over a wired or wireless link/physical layer. Examples of such layers include Ethernet, Wi-Fi (e.g., IEEE 802.11a/b/g/n), digital subscriber line (DSL), cable modem, and others. Also, network layers other than IP may be employed in other arrangements. The communication interface 502 may be implemented as a network interface card (NIC), circuitry located on a computer system motherboard, or via other circuit means.

The control circuitry 504 is configured to generate and transmit data packets via the communication interface 502 to one or more other nodes, as well as to receive and process data packets from those nodes by way of the interface 502. The structure and use of those packets is discussed in greater detail below. The control circuitry 504 may include one or more processors, such as a microprocessor, microcontroller, or digital signal processor (DSP), configured to execute instructions directing the processor to perform the functions and facilitate the communication discussed in greater detail below. The control circuitry 502 may also include memory or data storage adapted to contain such instructions. In another implementation, the control circuitry 502 may be strictly hardware-based logic, or may include a combination of hardware, firmware, and/or software elements.

Figure 6:
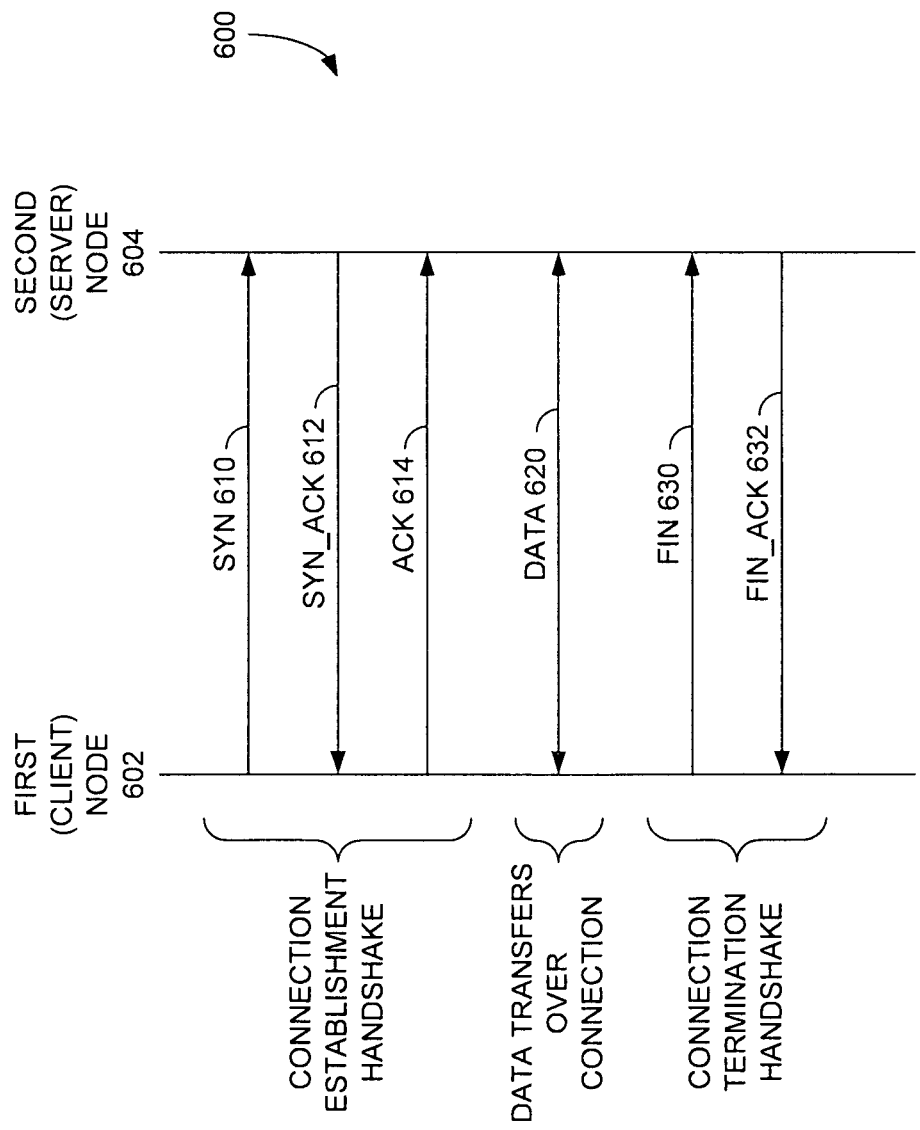
FIG. 6 is communication diagram of a handshaking protocol for establishing and terminating a connection between client and server nodes according to an embodiment of the invention.
Figure 7:
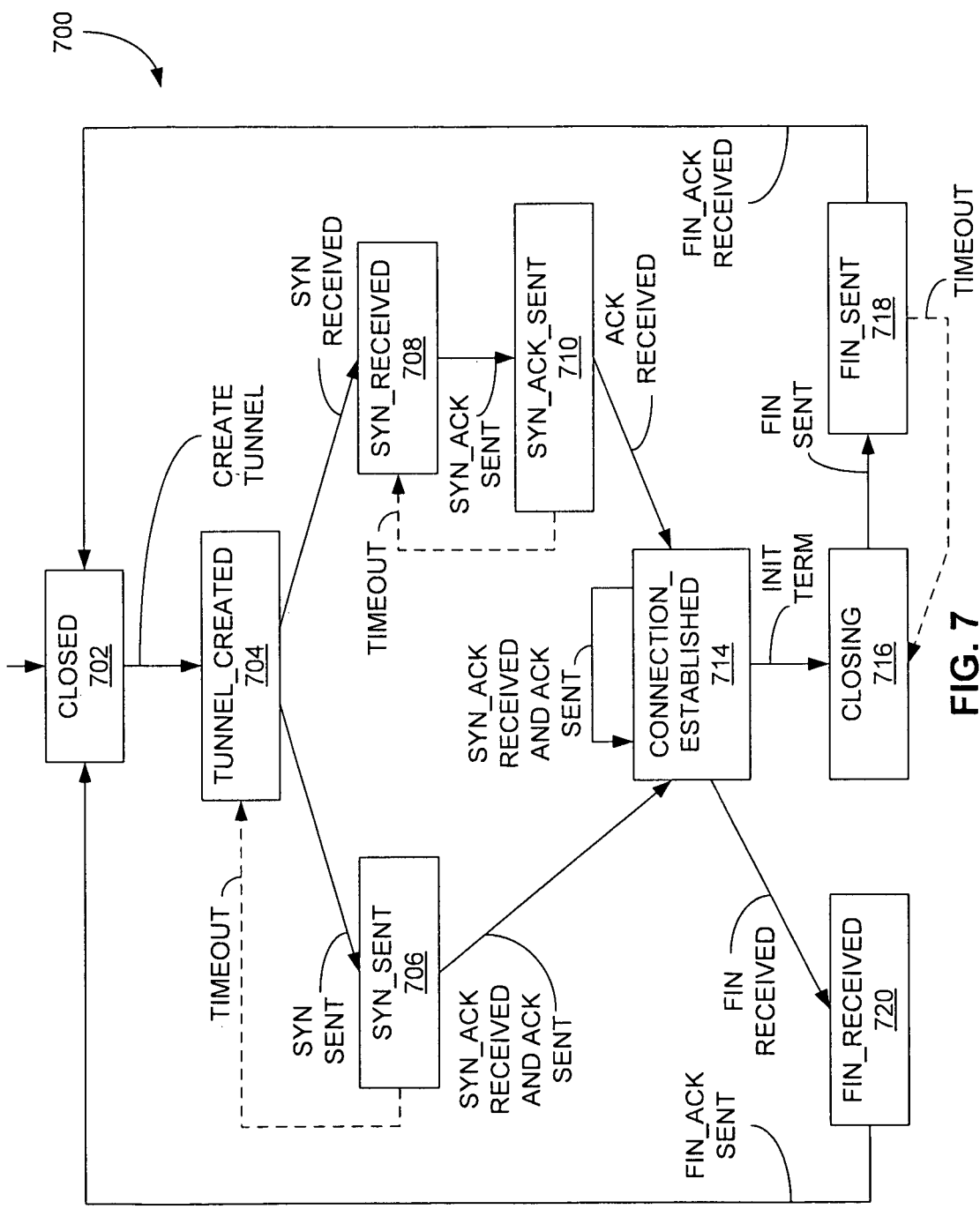
FIG. 7 is a state diagram depicting the establishment and termination of a connection between two nodes according to an embodiment of the invention.

FIG. 6 is a communication diagram 600 exemplifying various data packets transmitted by a first node 602 and a second node 604 to establish a connection, transfer data, and then terminate the connection. Similarly, FIG. 7 is a state diagram 700 depicting the various possible states and associated state transitions each of the nodes 602, 604 encounters during the establishment and termination of a connection in one implementation. In this particular example, the first node 602 operates as a client node, while the second node 604 is a server node. As is found in most client-server arrangements, the second node 604 is configured to receive connection requests prior to the transmission of such a request by the first node 602. One example of such an arrangement may be a user computer client requesting an audio/video data stream from a Slingbox server, which delivers audio/video sourced by a set-top box over the network to the client computer. Of course, many other communication environments involving different forms of data may benefit from the various tenets discussed below.

In FIG. 7, both the first (client) node 602 and the second (server) node 604 are presumed to reside in the CLOSED state 702, indicating that no connection is current established between the nodes 602, 604. To enable communication with the opposing node, each of the nodes 602, 604 employs their respective connectivity module 308 to create a tunnel or other communication path via the transport/network layer 310, thus placing both nodes 602, 604 into the TUNNEL_CREATED state 704. In one implementation, the tunnel or path is identified by way of a device address, such as an IP address, for each of the nodes 602, 604. Alternatively, the tunnel may be identified by way of a "finder ID" for at least one of the nodes 602, 604. In one example, the finder ID may be a logical identifier associated with one of the nodes 602, 604 that may be used to determine the IP address for that node 602, 604 by way of a look-up table.

After the creation of the tunnel or path, the first node 602 transmits a SYN data packet 610, thus initiating a handshake with the second node 604 to establish a connection. The SYN data packet 610, as well as all subsequent data packets involving the same connection, identify a local port indicator associated with the first node 602 and a remote port indicator associated with the second node 604. Thus, the particular connection to be established is identified by way of these port indicators, thus allowing multiple connections to be established between the nodes 602, 604 at any particular time. In one embodiment, each port indicator may be selected by the application 302 of the node 602, 604, or may be generated randomly or by other means by the sockets module 304.

As a result of transmitting the SYN data packet 610 to the second node 604, the first node 602 assumes the SYN_SENT state 706 and awaits an affirmative response from the second node 604. In one embodiment, the application 302 initiates the handshake by way of the sConnect( ) function call described earlier.

In response to receiving the SYN data packet 610, the second node 604 transitions to the SYN_RECEIVED state 708. In one embodiment, the second node 604 employs the sListen( ) function to enable its sockets module 304 prior to transmission of the SYN data packet 610 to receive the SYN data packet 610. Thereafter, the second node 604 transfers a SYN_ACK data packet 612 to the first node 602 to continue the handshake, and assumes the SYN_ACK_SENT state 710. In one implementation, once the SYN data packet 610 is received, the sockets module 304 notifies the application 302, which in turn calls the sAccept( ) module to transmit the SYN_ACK data packet 612.

To implement error recovery in the case of a missing or defective SYN data packet 610 or SYN_ACK data packet 612, either of which would cause the first node 602 to not receive the SYN_ACK packet 612, the first node 602 may implement a timeout period that is initiated after the SYN data packet 610 is transmitted. If the first node 602 then does not receive the SYN_ACK data packet 612 during the timeout period, the first node 602 may return to the TUNNEL_CREATED state 704, retransmit the SYN data packet 610, and transition again to the SYN_SENT state 706. In one implementation, the first node 602 may retransmit the SYN data packet 610 several times up to some maximum number while a corresponding SYN_ACK data packet 612 is not received. In a further embodiment, the time period may be different for two or more of the possible retransmissions of the SYN data packet 610, with the time periods possibly increasing or decreasing for each successive retransmission.

Presuming that the first node 602 successfully received the SYN_ACK data packet 612, the first node 602 would then complete the handshake by transmitting an ACK data packet 614 to the second node 604 to confirm receipt of the SYN_ACK data packet 612, and transition from the SYN_SENT state 706 to the CONNECTION_ESTABLISHED state 714. Correspondingly, upon receiving the ACK data packet 614, the second node 604 also assumes the CONNECTION_ESTABLISHED state 714, thus placing both nodes 602, 604 in agreement that a communication connection has been established therebetween.

Similar to the retransmission scheme employed by the first node 602 for the SYN data packet 610 discussed above, the second node 604 may implement error recovery in the case of a missing or defective SYN_ACK data packet 612 or ACK data packet 614, either of which may prevent the second node 604 from properly receiving the ACK packet 614. More specifically, the second node 604 may implement a timeout period that is initiated after the second node 604 transmits the SYN_ACK data packet 612. If the second node 604 then does not receive the ACK data packet 614 during the timeout period, the second node 604 may then return to the SYN_RECEIVED state 708, retransmit the SYN_ACK data packet 612, and again assume the SYN_ACK_SENT state 710. In one example, the second node 604 may retransmit the SYN_ACK data packet 612 a number of times up to some maximum value while a corresponding ACK data packet 614 is not received. In another implementation, the time period may be different for two or more of the possible retransmissions of the SYN_ACK data packet 612, with the time periods possibly increasing or decreasing for each successive retransmission. Further, the number of transmissions, and the associated time periods, may be different from those used for retransmission of the SYN data packet 610.

Presuming instead that the second node 604 successfully received the ACK data packet 614, both of the nodes 602, 604 operate within the CONNECTION_ESTABLISHED state 714. Further, the connection is identified in the nodes 602, 604 by way of the port indicators associated with each of the nodes 602, 604. During this state 714, transfer of user data packets 620, such as data packets containing audio/video data, as mentioned above, may then occur between the nodes 602, 604. In this scenario, since the first node 602 has already received the SYN_ACK data packet 612 from the second node 604, and since the mechanism shown in FIG. 6 does not require the second node 604 to issue an acknowledgment for the ACK data packet 614, a retransmission scheme for the ACK data packet 614 is generally not required. However, in some implementations, the first node 602 may be configured to transmit an ACK data packet 614 in response to receiving a SYN_ACK data packet 612 from the second node 604 after the first node 602 has already attained the CONNECTION_ESTABLISHED state 714.

While in the CONNECTION_ESTABLISHED state 714, the sockets module 304 facilitates the sending and receiving of data by way of the sSend( ) and sRecv( ) functions, which involve use of the reliability module 306 for sending and receiving the data in data packets under a scheme which may include sequencing, positive and/or negative acknowledge, and other protection mechanisms, as mentioned above.

Once either one of the nodes 602, 604 has determined that the data transfers are complete, and that the connection should be terminated, that node 602, 604 may begin terminating or closing the connection. Presuming the application 302 of the first node 602 has made this determination, the application 302 may initiate the termination of the connection by first using the sCloseSocket( ) function call, which in turn causes the first node 602 to enter the CLOSING state 716, initiate a FIN data packet 630, and transitions the first node 602 to the FIN_SENT state 718. Presuming the second node 602 successfully receives the FIN data packet 630, the second node 604 assumes the FIN_RECEIVED state 720, sends a FIN_ACK data packet 632 to the first node 602, and arrives at the CLOSED state 702, indicating that the connection has been terminated. Further, once the first node 602 receives the FIN_ACK data packet 632, the first node 602 also enters the CLOSED state 702, thus confirming that the connection is terminated.

In one implementation similar to others discussed above, while in the FIN_SENT state 718 after issuing the FIN data packet 630, if the first node 602 does not receive a corresponding FIN_ACK data packet 632 within a predetermined time period, the first node 602 may return to the CLOSING state 716, retransmit the FIN data packet 630, and proceed to the FIN_SENT state 718 again to await an associated FIN_ACK data packet 632. As before, retransmissions may continue for a predefined number of attempts while awaiting the FIN_ACK data packet 632, with a potentially different time period associated with each retransmission.

Figure 8:
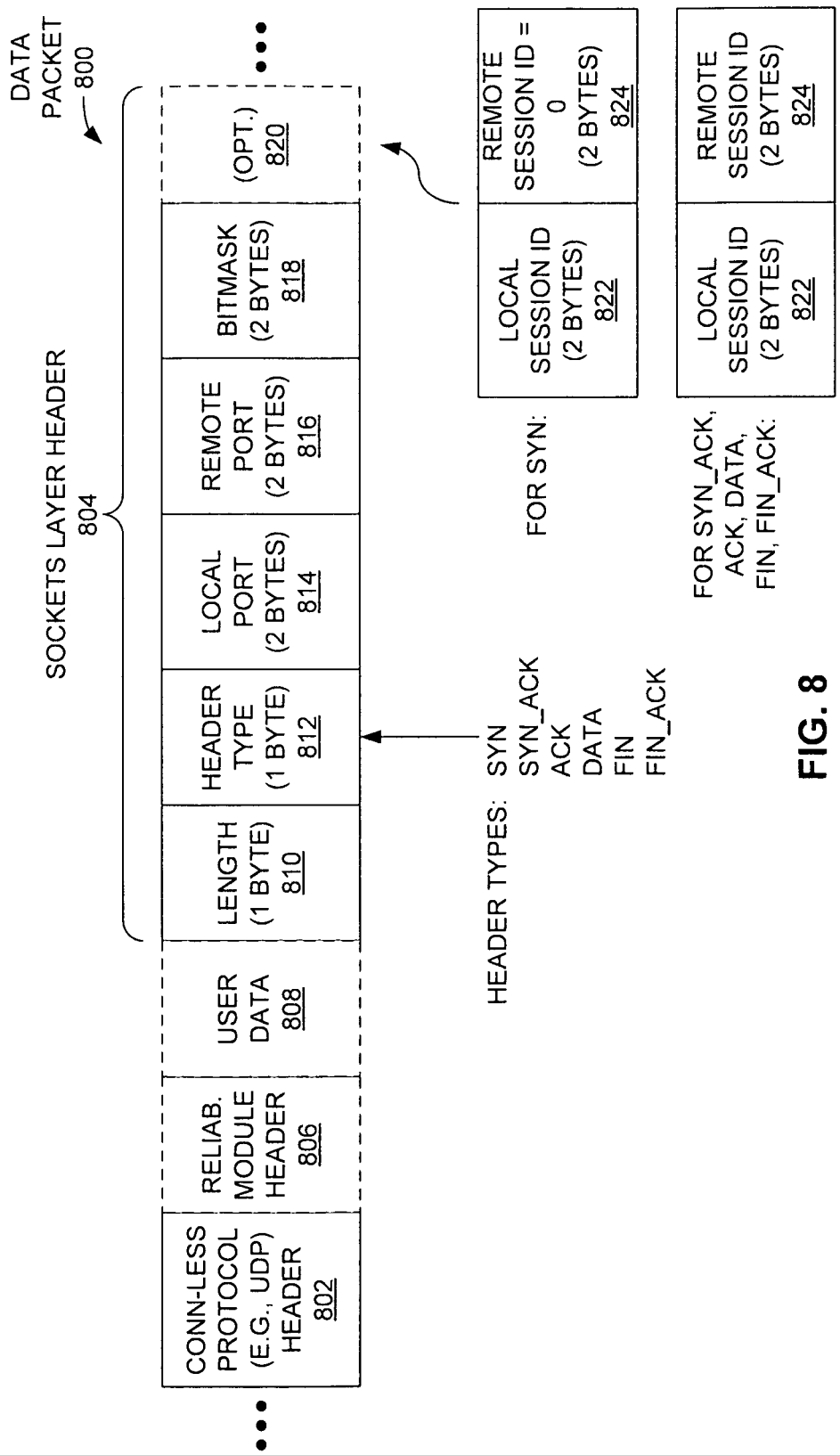
FIG. 8 is a graphical representation of a header generated by a sockets application programming interface within data packets transmitted between network nodes according to an embodiment of the invention.

Given the foregoing connection establishment, data transfer, and data termination mechanism, at least six different types of data packets may be employed, including the SYN packet 610, the SYN_ACK packet 612, the ACK packet 614, the DATA packet 620, the FIN packet 630, and the FIN_ACK packet 632. An example format of a packet 800 for each of these packet types is depicted in FIG. 8. In this example, a header is added at each of several different communication protocol layers as the packet 800 is passed downward through the levels before the packet is transmitted to another node 602, 604. In the particular example of FIG. 8, in the case of a DATA packet 620 being generated for transmission to another node, the reliability module 306 may assemble a packet of user data 808 with a leading reliability module header 806, which may incorporate data allowing the reliability module 306 to perform the sequencing, positive and/or negative acknowledgment, and other data protection mechanisms described earlier.

As the packet 800 is transferred from the reliability module 306 to the sockets module 304, the sockets module 304 attaches a separate sockets layer header 804, providing data capable of supporting the various functions attributed above to the sockets module 304. In the example of FIG. 8, this header 804 is applied to the end of the user data 808 in the data packet 800, although other locations for the sockets layer header 804 may be utilized in other implementations. This data is described in greater detail below. The packet 800 is then forwarded to the transport/network layer 310, which attaches a connectionless protocol layer header 802, such as a UDP header, to the packet 800 before transmitting the packet 800 over the network to another node. In some embodiments, other headers and data not illustrated in FIG. 8 may also be added to the packet 800.

In FIG. 8, the sockets layer header 804 provided by the sockets module 304 includes a length 810 (in bytes) of the header, a header type 812, a local port indicator 814, a remote port indicator 816, a bitmask 818, and an optional field 820. The header type 812 indicates which type of packet (i.e., SYN 610, SYN_ACK 612, ACK 614, DATA 620, FIN 630, or FIN_ACK 632) is represented by the data packet 800. In one implementation, the reliability module header 806 and the user data 808 of FIG. 8 are present only if the header type 812 indicates a DATA packet 620. The header type 812 may indicate which type of packet by way of bitwise representation, by bit-encoded representation, or by some other means of representation.

The local port indicator 814 and the remote port indicator 816 denote a particular port for the node originating the packet 800 and a specific port for the node receiving the packet 800, respectively. The connectionless protocol header 802, such as a UDP header, may also include port indicators, such as a source port indicator and a destination port indicator. In UDP, such port indicators are typically 16 bits in length, with each port identifying a software structure configured to exchange data specifically associated with a particular application or service. Depending on the implementation, the port indicators 814, 816 of the sockets layer header 804 may or may not correspond to the port indicators of the connectionless protocol header 802. For example, the local port indicator 814 and the source port of the connectionless protocol header 802 may be the same, as well as the remote port indicator 816 and the destination port of the connectionless protocol header 802 if the two connected nodes 602, 604 reside on the same LAN. Thus, within a single LAN, the connection between the two nodes may be designated by way of an IP address and a port indicator (as designated in both the connectionless protocol header 802 and the sockets layer header 804).

In another example, the two communicating nodes 602, 604 may reside in separate LANs, thus communicating over a WAN. In that scenario, a finder ID may be employed to identify at least one or both of the nodes 602, 604. In that case, the port indicator associated with that node 602, 604 may be a logical port indicator not associated with a port of the connectionless protocol header 802. In one example, the logical port indicator may be generated at random, thus reducing the likelihood that the logical port indicator will be identical to another logical port indicator associated with another connection between the nodes 602, 604.

Use of the local port indicator 814 and the remote port indicator 816, whether they refer to logical ports or to ports of the connectionless protocol header 802, facilitates concurrent multiplexing of different data streams being transmitted or received by a single node 602, 604. More specifically, each separate port of a node 602, 604, as identified in the sockets layer header 804, may be associated with a separate connection with another node 602, 604. Accordingly, each connection may be established, used, and terminated in parallel with other connections involving the same node 602, 604, thus allowing the node 602, 604 to service or process several different data streams simultaneously.

The bitmask 818 may be employed as a mask to condition data provided in the optional field 820. In one embodiment, the optional field may include a session identifier for each of the nodes 602, 604 associated with a connection. In the example depicted in FIG. 8, each of the packet types (i.e., SYN 610, SYN_ACK 612, ACK 614, DATA 620, FIN 630, and FIN_ACK 632) may include in the sockets layer header 804 a local session identifier 822 for the node 602, 604 issuing the data packet 800, and a remote session identifier 824 associated with the node 602, 604 receiving the packet 800. In the case of the SYN packet 610, the remote session identifier 824 is set to zero, as the remote session identifier 824 associated with the node 602, 604 receiving the SYN packet 610 is yet to be determined. These session identifiers 822, 824, which may be generated randomly for each session, may distinguish different sessions existing at different times over the same port of a node 602, 604. For example, a first stream of audio/video data may be carried over a connection from the second node 604 to the first node 602 via a particular port of the first node 602. At the conclusion of that stream, that connection may be terminated. Another connection involving the same port of the first node 602 may then be established to carry another audio/video stream, thus representing a different session. By employing different session identifiers 822, 824 for the two sessions, the first node 602 may safely ignore or discard late-arriving packets 800 of the previous session based on the older session identifier 822, 824 included in the sockets layer header 804 of the older packets 800.

At least some embodiments as described herein for establishing connections between two network nodes by way of a connectionless communication protocol may provide a number of advantages. Overall, establishing connections in such a manner allows the use of a standard connectionless transport layer, such as UDP, with its minimal communication overhead, as well as its associated network IP layer, while incorporating connection mechanisms that potentially surpass the connection performance normally associated with TCP, such as by providing handshaking retry mechanisms, robust support for multiple concurrent connections, and other advantages. Further, software or firmware implementing the various embodiments discussed herein may further facilitate deployment of advanced data reliability schemes that may perform better than TCP in certain challenging communication environments.

While several embodiments of the invention have been discussed herein, other implementations encompassed by the scope of the invention are possible. For example, while various embodiments have been described primarily within the context of network connections carrying audio/video stream communications, any other form of data that may be transmitted and received by nodes of a communication network, such as an IP network, may be transferred via connections established according to the various concepts described herein. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of establishing a network connection via a connectionless transport layer communication protocol, the method comprising:
   exchanging a plurality of data packets between a first node of a network and a second node of the network, wherein each of the data packets comprises a header and a payload formatted according to the connectionless protocol, wherein the connectionless protocol payload of each of the data packets comprises a separate header comprising a first port indicator for the first node randomly selected by the first node and a second port indicator for the second node, and wherein the separate header of at least one of the data packets comprises an indication to establish a connection between the first node and the second node; and
   establishing, at the first node and the second node, in response to exchanging the data packets, the connection between the first node and the second node, wherein the connection is established using a port at the first node associated with first port indicator and a port at the second node associated with the second port indicator.

2. The method of claim 1, further comprising:
   exchanging a second plurality of data packets between the first node and the second node, wherein each of the second plurality of data packets comprises a header and a payload formatted according to the connectionless protocol, wherein the connectionless protocol payload of each of the second plurality of data packets comprises a separate header comprising a third port indicator for the first node selected by the first node and a fourth port indicator for the second node, and wherein the separate header of at least one of the second plurality of data packets comprises an indication to establish a second connection between the first node and the second node, and wherein the third port indicator identifies a different port than the first port indicator; and
   at the first node and the second node, in response to exchanging the second plurality of data packets, establishing the second connection between the first node and the second node, wherein the third port indicator and the fourth port indicator are associated with the second established connection, and wherein the first connection and the second connection are established concurrently.

3. The method of claim 1, wherein:
   the separate header of at least one of the data packets comprises a first session identifier for the first node and a second session identifier for the second node, wherein the first session identifier and the second session identifier are associated with the connection; and
   the method further comprises verifying whether the at least one of the data packets belongs to a current session using at least one of the first session identifier and the second session identifier.

4. The method of claim 3, further comprising:
   discarding the at least one of the data packets if the at least one of the data packets does not belong to the current session.

5. The method of claim 1, wherein exchanging the plurality of data packets comprises:
   transmitting a first data packet of the data packets from the first node to the second node, wherein the separate header of the first data packet comprises the indication to establish the connection with the second node, the first port indicator, and the second port indicator;
   receiving the first data packet at the second node; and
   transmitting a second data packet of the data packets from the second node to the first node, wherein the separate header of the second data packet comprises an indication of a first acknowledgment of the indication to establish the connection, the first port indicator, and the second port indicator.

6. The method of claim 5, wherein exchanging the plurality of data packets further comprises:
   awaiting the second data packet at the first node; and
   retransmitting the first data packet from the first node to the second node if the second data packet is not received at the first node within a first predetermined time period after the transmitting of the first data packet.

7. The method of claim 5, wherein exchanging the plurality of data packets further comprises:
   receiving the second data packet at the first node; and
   transmitting a third data packet of the data packets from the first node to the second node, wherein the separate header of the third data packet comprises an indication of a second acknowledgment of the first acknowledgment, the first port indicator, and the second port indicator;
   wherein establishing the connection occurs at the first node in response to transmitting the third data packet.

8. The method of claim 7, wherein exchanging the plurality of data packets further comprises:
   awaiting the third data packet at the second node; and
   retransmitting the second data packet from the second node to the first node if the third data packet is not received at the second node within a second predetermined time period after the transmitting of the second data packet.

9. The method of claim 7, wherein exchanging the plurality of data packets further comprises:
   receiving the third data packet at the second node;
   wherein establishing the connection occurs at the second node in response to receiving the third data packet.

10. The method of claim 1, wherein:
    for each of the data packets, the connectionless protocol header comprises a port indicator different from the first port indicator and the second port indicator, wherein the first port indicator is not a user datagram protocol port and wherein the second port indicator is not a user datagram protocol port.

11. The method of claim 10, wherein: the connectionless protocol comprises a user datagram protocol.

12. The method of claim 1, further comprising:
    after establishing the connection between the first node and the second node, transmitting a second plurality of data packets between the first node and the second node, wherein each of the second plurality of data packets comprises a header and a payload formatted according to the connectionless protocol, wherein the connectionless protocol payload of each of the second plurality of data packets comprises user data and a separate header comprising the first port indicator, the second port indicator, and an indication that the associated data packet includes the user data.

13. The method of claim 12, further comprising:
after transmitting the second plurality of data packets, exchanging a third plurality of data packets between the first node and the second node, wherein each of the third plurality of data packets comprises a header and a payload formatted according to the connectionless protocol, wherein the connectionless protocol payload of each of the third plurality of data packets comprises a separate header comprising the first port indicator and the second port indicator, and wherein the separate header of at least one of the third plurality of data packets comprises an indication to terminate the established connection between the first node and the second node.

14. The method of claim 13, wherein exchanging the third plurality of data packets comprises:
transmitting a first data packet of the third plurality of data packets from the first node to the second node, wherein the separate header of the first data packet of the third plurality of data packets comprises the first port indicator, the second port indicator, and the indication to terminate the established connection;
receiving the first data packet of the third plurality of data packets at the second node;
transmitting a second data packet of the third plurality of data packets from the second node to the first node, wherein the separate header of the second data packet of the third plurality of data packets comprises an acknowledgment of the indication to terminate the established connection, the first port indicator, and the second port indicator;
terminating the connection in the second node in response to transmitting the second data packet of the third plurality of data packets;
receiving the second data packet of the third plurality of data packets at the first node; and
terminating the connection in the first node in response to receiving the second data packet of the third plurality of data packets.

15. The method of claim 14, wherein exchanging the third plurality of data packets comprises:
awaiting the second data packet of the third plurality of data packets at the first node; and
retransmitting the first data packet of the third plurality of data packets from the first node to the second node if the second data packet of the third plurality of data packets is not received at the first node within a first predetermined time period.

16. A node for a communication network, the node comprising:
a communication interface configured to transmit and receive data packets with another node of the network; and
control circuitry configured to randomly generate a first port indicator, generate a data packet comprising a header and a payload formatted according to a connectionless transport layer communication protocol, wherein the connectionless protocol payload comprises a separate header comprising the first port indicator for the node, a second port indicator for the other node, and an indication to establish a connection with the other node using a port associated with the first port indicator at the node and a port associated with the second port indicator at the other node;
wherein the control circuitry is configured to transmit the data packet by way of the communication interface to the other node;
wherein the control circuitry is configured to receive by way of the communication interface a second data packet from the other node, wherein the second data packet comprises a header and a payload formatted according to the connectionless protocol, and wherein connectionless protocol payload of the second data packet comprises a separate header comprising an indication of a first acknowledgment of the indication to establish the connection, the first port indicator, and the second port indicator; and
wherein the control circuitry is configured to determine that a connection between the node and the other node is established using the port associated with the first port indicator at the node and the port associated with the second port indicator at the other node after the second data packet is received at the node.

17. The node of claim 16, wherein:
the control circuitry is configured to await the second data packet from the other node via the communication interface for a predetermined period of time after the transmission of the first data packet to the other node, and to retransmit the first data packet via the communication interface to the other node if the second data packet is not received via the communication interface within the predetermined period of time.

18. The node of claim 16, wherein:
the control circuitry is configured to generate a third data packet comprising a header and a payload formatted according to the connectionless protocol, wherein the connectionless protocol payload of the third data packet comprises a separate header comprising the first port indicator, the second port indicator, and an indication of a second acknowledgment to the first acknowledgment, and to transfer the third data packet by way of the communication interface to the other node.

19. The node of claim 16, wherein:
the connectionless protocol comprises a user datagram protocol, wherein the first port indicator is not a user datagram protocol port and wherein the second port indicator is not a user datagram protocol port.

20. A node for a communication network, the node comprising:
a communication interface configured to transmit and receive data packets with another node of the network; and
control circuitry configured to receive a data packet comprising a header and a payload formatted according to a connectionless transport layer communication protocol from the other node via the communication interface, wherein the communication protocol payload comprises a separate header comprising a first port indicator for the other node randomly selected by the other node, a second port indicator for the node, and an indication to establish a connection with the other node using a port associated with the first port indicator at the other node and a port associated with the second port indicator at the node;
wherein the control circuitry is configured to generate a second data packet comprising a header and a payload formatted according to the connectionless protocol, and wherein the connectionless protocol payload of the second data packet comprises a separate header comprising an indication of a first acknowledgment of the indication to establish the connection, the first port indicator, and the second port indicator;

wherein the control circuitry is configured to transmit the second data packet by way of the communication interface to the other node; and wherein the control circuitry is configured to determine that a connection between the node and the other node is established using the port associated with the first port indicator at the other node and the port associated with the second port indicator at the node after the second data packet is transmitted via the communication interface.

21. The node of claim 20, wherein:

the control circuitry is configured to await a third data packet from the other node via the communication interface for a predetermined period of time after the transmission of the second data packet to the other node, and to retransmit the second data packet via the communication interface to the other node if the third data packet is not received via the communication interface within the predetermined period of time.

22. The node of claim 20, wherein:

the connectionless protocol comprises a user datagram protocol.

* * * * *